US005231967A

United States Patent [19]

Baltz et al.

[11] Patent Number: 5,231,967

[45] Date of Patent: Aug. 3, 1993

[54] FUEL PUMP AND FUEL FILTER FOR A MARINE INSTALLATION

[75] Inventors: Gene F. Baltz, Lake Villa; Jon W. Butts, Zion; Paul M. Dayenian, Waukegan, all of Ill.

[73] Assignee: Outboard Marine Corporation, Waukegan, Ill.

[21] Appl. No.: 808,846

[22] Filed: Dec. 16, 1991

Related U.S. Application Data

[60] Continuation-in-part of Ser. No. 761,424, Sep. 17, 1991, abandoned, which is a division of Ser. No. 637,460, Jan. 4, 1991, abandoned.

[51] Int. Cl.[5] ...................... F02M 37/04; B01D 29/00

[52] U.S. Cl. .................................... 123/497; 123/509; 123/510; 123/516; 210/416.4

[58] Field of Search ............... 123/497, 509, 510, 512, 123/514; 210/416.4

[56] References Cited

U.S. PATENT DOCUMENTS

| | | | |
|---|---|---|---|
| 1,799,771 | 4/1931 | Wheeler . | |
| 1,864,219 | 6/1932 | Rockwell . | |
| 2,308,746 | 1/1943 | Flint | 123/139 |
| 2,882,884 | 4/1959 | Scheiterlein | 123/509 |
| 2,989,644 | 6/1961 | Schultz | 290/36 |
| 3,066,527 | 12/1962 | Stein | 123/198 DB |
| 3,082,875 | 3/1963 | Korte | 210/416 |
| 3,239,064 | 3/1966 | White | 210/436 |
| 3,254,769 | 6/1966 | McArthur | 210/194 |
| 3,278,032 | 10/1966 | Smith | 210/416.4 |
| 3,418,991 | 12/1968 | Schultz | 123/179 |
| 3,502,895 | 3/1970 | Ballou | 290/36 |
| 3,530,991 | 9/1970 | Phillips | 210/349 |
| 3,573,482 | 4/1971 | Brooks | 290/38 |
| 3,742,256 | 6/1973 | Frederiksen | 307/254 |
| 3,875,059 | 4/1975 | Maschino | 210/172 |
| 3,897,771 | 8/1975 | Stumpp | 123/198 |
| 3,912,423 | 10/1975 | Pfabe | 417/313 |
| 4,054,108 | 10/1977 | Gill | 123/509 |
| 4,077,381 | 3/1978 | Firey | 123/179 |
| 4,204,511 | 5/1980 | Morris | 123/187.5 |
| 4,320,734 | 3/1982 | Balachandran | 123/198 D |
| 4,412,513 | 11/1983 | Obermayer et al. | 123/509 |
| 4,491,143 | 1/1985 | Yasuhara | 123/198 DB |
| 4,522,170 | 6/1985 | Lenk et al. | 123/196 S |
| 4,551,071 | 11/1985 | Ohgaki | 417/313 |
| 4,602,605 | 7/1986 | Adkins | 123/196 S |
| 4,727,274 | 2/1988 | Adam et al. | 310/71 |
| 4,747,378 | 5/1988 | Cantoni | 123/196 S |
| 4,748,356 | 5/1988 | Okashiro et al. | 310/43 |
| 4,766,860 | 8/1988 | Abe et al. | 123/73 A |
| 4,776,315 | 10/1988 | Greiner | 123/198 D |
| 4,811,717 | 3/1989 | Nakahama | 123/509 |
| 4,845,393 | 7/1989 | Burgess et al. | 123/497 |
| 4,869,225 | 9/1989 | Nagata | 123/509 |
| 4,870,392 | 9/1989 | Baltz | 340/608 |
| 4,885,082 | 12/1989 | Cantoni | 123/196 S |
| 4,913,108 | 4/1990 | Sougawa et al. | 123/196 S |
| 4,966,522 | 10/1990 | Koyama | 415/121.2 |
| 5,013,222 | 5/1991 | Sokol et al. | 123/497 |
| 5,024,188 | 6/1991 | Hartke et al. | 123/416.4 |
| 5,036,822 | 8/1991 | Kojima | 123/509 |
| 5,046,471 | 9/1991 | Schmid | 123/510 |
| 5,055,758 | 10/1991 | Hock | 123/497 |
| 5,085,198 | 2/1992 | Bartlett et al. | 123/510 |
| 5,103,793 | 4/1992 | Riese et al. | 123/510 |

FOREIGN PATENT DOCUMENTS

| | | | |
|---|---|---|---|
| 2-185659 | 7/1990 | Japan | 210/416.4 |

*Primary Examiner*—E. Rollins Cross
*Assistant Examiner*—Thomas Moulis
*Attorney, Agent, or Firm*—Michael, Best & Friedrich

[57] ABSTRACT

An apparatus comprising a fuel pump, an internal combustion engine having an oil pressure and including an engine block and a crankshaft rotatably supported by the engine block, the apparatus further comprising structure for providing a first electrical signal while the engine is running, a starter selectively operable to rotate the crankshaft, structure for providing a second electrical signal while the starter rotates the crankshaft, and structure for causing the fuel pump to supply fuel to the internal combustion engine only while at least one of the first and second signals is present and without regard to the oil pressure of the internal combustion engine.

50 Claims, 5 Drawing Sheets

Fig. 4
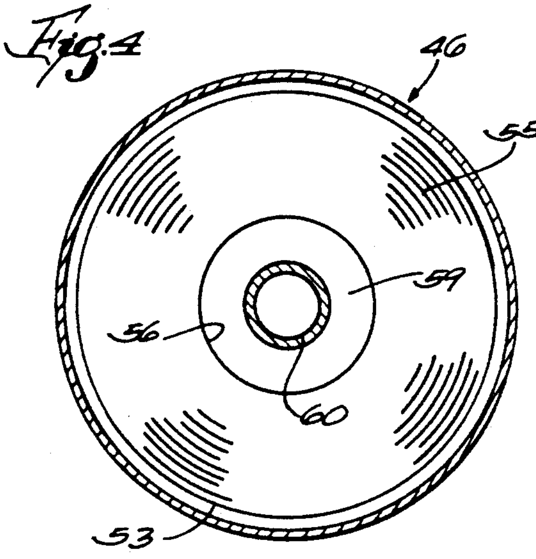
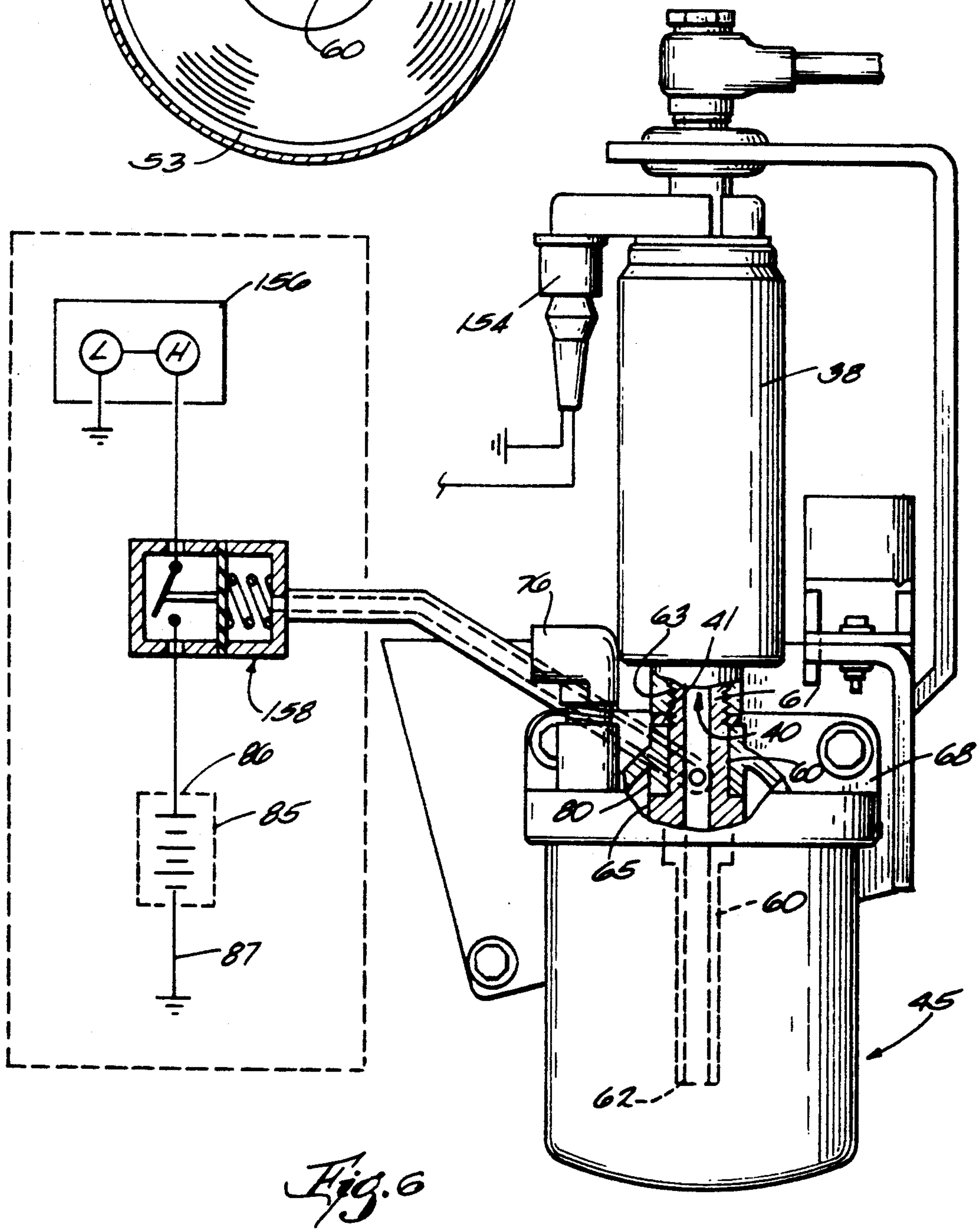
Fig. 6

FUEL PUMP AND FUEL FILTER FOR A MARINE INSTALLATION

RELATED APPLICATION

This is a continuation-in-part of Ser. No. 761,424, which was filed Sep. 17, 1991, now abandoned and which is a division of Ser. No. 637,460, filed Jan. 4, 1991, now abandoned.

BACKGROUND OF THE INVENTION

The invention relates generally to fuel supply systems for marine propulsion devices, and more particularly to fuel supply systems for stern drive units. The invention also relates to fuel filters for internal combustion engines and, more particularly, to fuel filters used with electric fuel pumps that supply fuel to internal combustion engines of marine installations.

It is known to mount a mechanical fuel pump on a stern drive engine block. Such a mechanical fuel pump can "lift" fuel from a remote fuel tank to the engine. It is also known to use a roller-vane-type electric fuel pump in connection with a stern drive. Such a fuel pump has been located on a stringer, in the bottom of the boat, with an upstream filter. Such a pump cannot lift fuel to the engine. This type of pump "pushes" fuel to the engine. Lifting fuel is important for stern drive units because a primer bulb is not available. A primer bulb cannot be used on a stern drive because it would not pass the "burn test" (described below).

U.S. Pat. No. 5,036,822 discloses a submersible electric pump mounted on the engine of an outboard motor. Electric fuel pumps have not been mounted on stern drive engines because of, among other things, the adverse effect of vibration and heat transfer.

Fuel filters used with electric fuel pumps are usually provided downstream of the fuel pump. See, for example, White U.S. Pat. No. 3,239,064, issued on Mar. 8, 1966. Also, filter elements of fuel filters used with electric fuel pumps are not always readily removable for replacement.

Conventional marine installations include an internal combustion engine, a starter for cranking the engine to start the engine, and a fuel system for supplying fuel to the engine. The fuel system includes a mechanical fuel pump that has an inlet and an outlet and that is driven by the internal combustion engine, a fuel filter that has an inlet and an outlet, a fuel line connecting the fuel pump inlet to a fuel supply, a fuel line connecting the fuel pump outlet to the fuel filter inlet, and a fuel line connecting the fuel filter outlet to the internal combustion engine. The flow rate of fuel supplied to the internal combustion engine by the mechanical fuel pump is a function of the speed of the internal combustion engine, and the flow rate of fuel pumped by the fuel pump when the engine is being cranked is relatively low. With a dry fuel system, starting of the engine is delayed until the mechanical fuel pump, pumping fuel at the relatively low flow rate while the engine is being cranked, can draw fuel from the fuel supply through one of the fuel lines and supply sufficient fuel to the internal combustion engine, via the fuel filter and the other fuel lines, for the engine to start.

Conventional circuitry for preventing an electric fuel pump from operating when the internal combustion engine is not running typically includes an oil pressure sensing switch. In such a circuit, the fuel pump will only be energized while the oil pressure sensing switch senses an oil pressure, in the engine, above a predetermined threshold. If the engine stalls, the oil pressure in the engine will fall below the predetermined threshold and the oil pressure sensing switch will disconnect the fuel pump from its source of electrical energy. When the engine is being started, oil pressure must rise above the predetermined threshold before the oil pressure sensing switch will connect the fuel pump to the source of electrical energy. Thus engine starting is delayed until oil pressure rises above the predetermined threshold.

SUMMARY OF THE INVENTION

The invention provides an improved fuel supply system for a stern drive unit. More particularly, the invention provides such a fuel supply system with a non-submersible, electric fuel pump mounted on the engine of a stern drive unit. The fuel supply system also includes a fuel filter cartridge mounted directly beneath and upstream of the pump. The cartridge is threadedly connected to the pump and is therefore easily removed and replaced. This simplifies maintenance. Because of its location, the cartridge shields the pump from fire beneath the pump.

Prior art stern drive fuel supply systems include either a mechanical fuel pump mounted on the engine or an electric fuel pump located remotely from the engine. In prior art arrangements, the electric fuel pump cannot be mounted on the stern drive engine because the pump is not capable of "dry priming" the engine. In other words, the pump cannot pull or suck or "lift" fuel through a dry fuel conduit from the remote fuel tank to the engine. As a result, prior art arrangements using electric fuel pumps have the pump mounted on the bottom of the boat, remote from the engine, so that the pump can "push" fuel up to the engine.

Lifting fuel to the engine is not a problem with outboard motors because outboard motors have a primer bulb that dry primes the engine. Thus, the electric fuel pump of U.S. Pat. No. 5,036,822 is not required to, and is not capable of, dry priming the engine.

Specifically, the invention provides a marine propulsion device comprising a drive unit which is adapted to be mounted on the transom of a boat and which includes a propeller shaft, an internal combustion engine drivingly connected to the propeller shaft, an electric fuel pump for supplying fuel to the engine, and means mounted on the fuel pump for reducing the transmission of radio frequency interference.

The invention also provides a marine propulsion device comprising a drive unit which is adapted to be mounted on the transom of a boat and which includes a propeller shaft, an internal combustion engine drivingly connected to the propeller shaft, and an electric fuel pump which is mounted on the engine, which supplies fuel to the engine, and which is capable of lifting fuel approximately 40 inches from a remote fuel tank.

The invention also provides a marine propulsion device comprising a drive unit which is adapted to be mounted on the transom of a boat and which includes a propeller shaft, an internal combustion engine drivingly connected t the propeller shaft, an electric fuel pump for supplying fuel to the engine, the pump including an upper end having therein an outlet communicating with the engine, and a lower end having therein an inlet adapted to communicate with a source of fuel, and a fuel filter cartridge which is located directly below the pump and which includes a housing having an outlet communicating with the pump inlet and an inlet adapted to communicate with the fuel source, and a fuel filter located in the housing.

The invention also provides a marine propulsion device comprising a drive unit which is adapted to be mounted on the transom of a boat and which includes a propeller shaft, an internal combustion engine drivingly connected to the propeller shaft, an electric fuel pump which is mounted on the engine and which includes an outlet communicating with the engine, and an inlet, and a fuel filter cartridge which is mounted on the engine and which includes a housing having an outlet communicating with the pump inlet and an inlet adapted to communicate with the fuel source, and a fuel filter located in the housing, the pump and the filter cartridge being operably connected to each other as a unit prior to mounting of the unit on the engine.

The invention also provides a stern drive unit comprising a drive unit which is adapted to be mounted on the transom of a boat and which includes a propeller shaft, an internal combustion engine which is drivingly connected to the propeller shaft, which is adapted to be mounted inside the boat, and which includes an engine block, a non-submersible electric fuel pump which is mounted on the engine block and which supplies fuel to the engine, the pump including an upper end having therein an outlet communicating with the engine, a lower end having therein an inlet adapted to communicate with a source of fuel, and positive and negative terminals, a radio frequency interference suppressor removably mounted on the pump in contact with the terminals, and means located below the pump for shielding the pump from flames below the pump, the means including a fuel filter cartridge which is located directly below the pump, and which includes a housing having an outlet communicating with the pump inlet, and an inlet adapted to communicate with the fuel source, and also includes a fuel filter located in the housing.

The invention also provides a marine propulsion device comprising a drive unit which is adapted to be mounted on the transom of a boat and which includes a propeller shaft, an internal combustion engine drivingly connected to the propeller shaft, a non-submersible electric fuel pump adapted to be located exteriorly of a fuel tank for supplying fuel from the tank to the engine, and fuel filter means upstream of the fuel pump.

In one aspect of the invention, a fuel filter is provided upstream of a fuel pump. This minimizes the potential of foreign particles entering into the fuel pump and causing damage to the fuel pump.

In another aspect of the invention, an electric fuel pump is included in a marine installation. As the flow rate of fuel pumped by an electric fuel pump is independent of engine speed, an electric fuel pump provides faster filling of a marine fuel system for faster engine starting.

In another aspect of the invention, a fuel filter is directly attached to an electric fuel pump, thus minimizing the volume of the fuel system for faster engine starting.

Various other features of the invention will become apparent to those of ordinary skill in the art upon review of the following detailed description of the preferred embodiment of the invention, reference being made to the appended drawings, and upon review of the following claims.

BRIEF DESCRIPTION OF THE VIEWS OF THE DRAWINGS

FIG. 4 is a sectional view taken along line 4—4 of FIG. 3.

FIG. 6 is a side elevational view, partially broken away and partly in section, showing an optional modification to the apparatus of FIG. 1.

Figure 1:
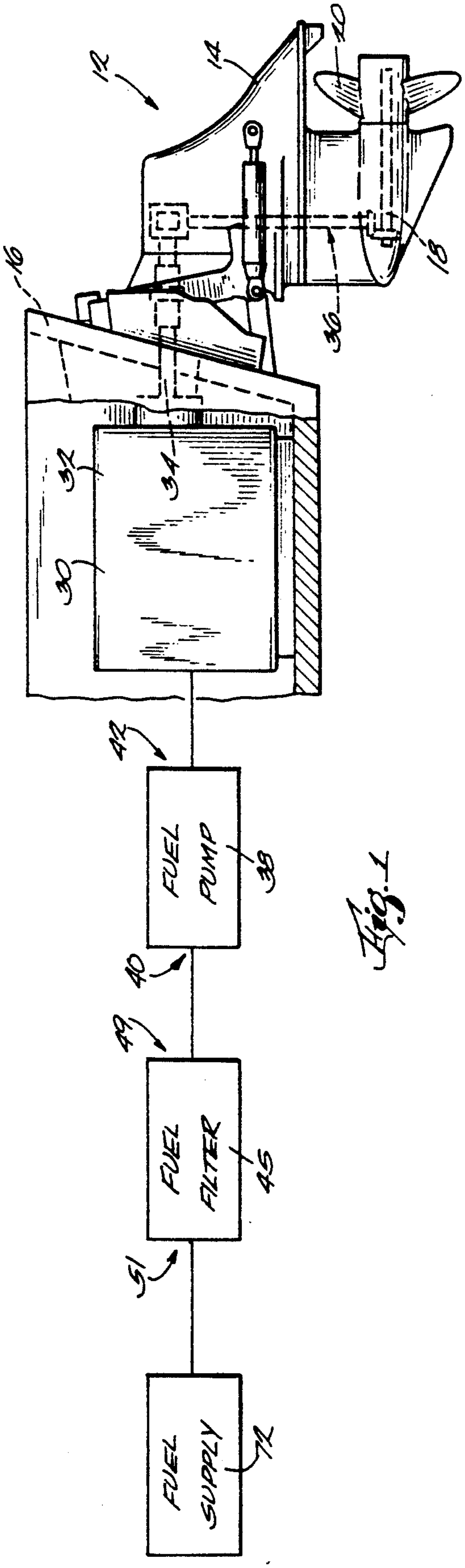
FIG. 1 is a side elevational view of a marine installation which includes a fuel pump, a fuel filter, and an internal combustion engine, and which embodies various of the features of the invention.

Before one embodiment of the invention is explained in detail, it is to be understood that the invention is not limited in its application to the details of construction and the arrangement of components set forth in the following description or illustrated in the drawings. The invention is capable of other embodiments and of being practiced or carried out in various ways. Also, it is to be understood that the phraseology and terminology used herein is for the purpose of description and should not be regarded as limiting.

DETAILED DESCRIPTION OF THE PREFERRED EMBODIMENT OF THE INVENTION

Shown in the various figures is a marine installation 10. The marine installation includes a marine propulsion device which, in the illustrated construction, is a stern drive unit 12. The stern drive unit 12 comprises a drive unit 14 mounted on the transom 16 of a boat. The drive unit 14 includes a propeller shaft 18 having thereon a propeller 20. The stern drive unit 12 also comprises an internal combustion engine 30 mounted inside the boat. The engine 30 is lubricated by oil and has a positive oil pressure when running. The internal combustion engine 30 includes an engine block 32 that rotatably supports a crankshaft 34. Power developed by the internal combustion engine 30 is transferred to the propeller shaft 26 by means of a drive shaft assembly 36 drivingly connecting the crankshaft 34 to the propeller shaft 26.

Figure 2:
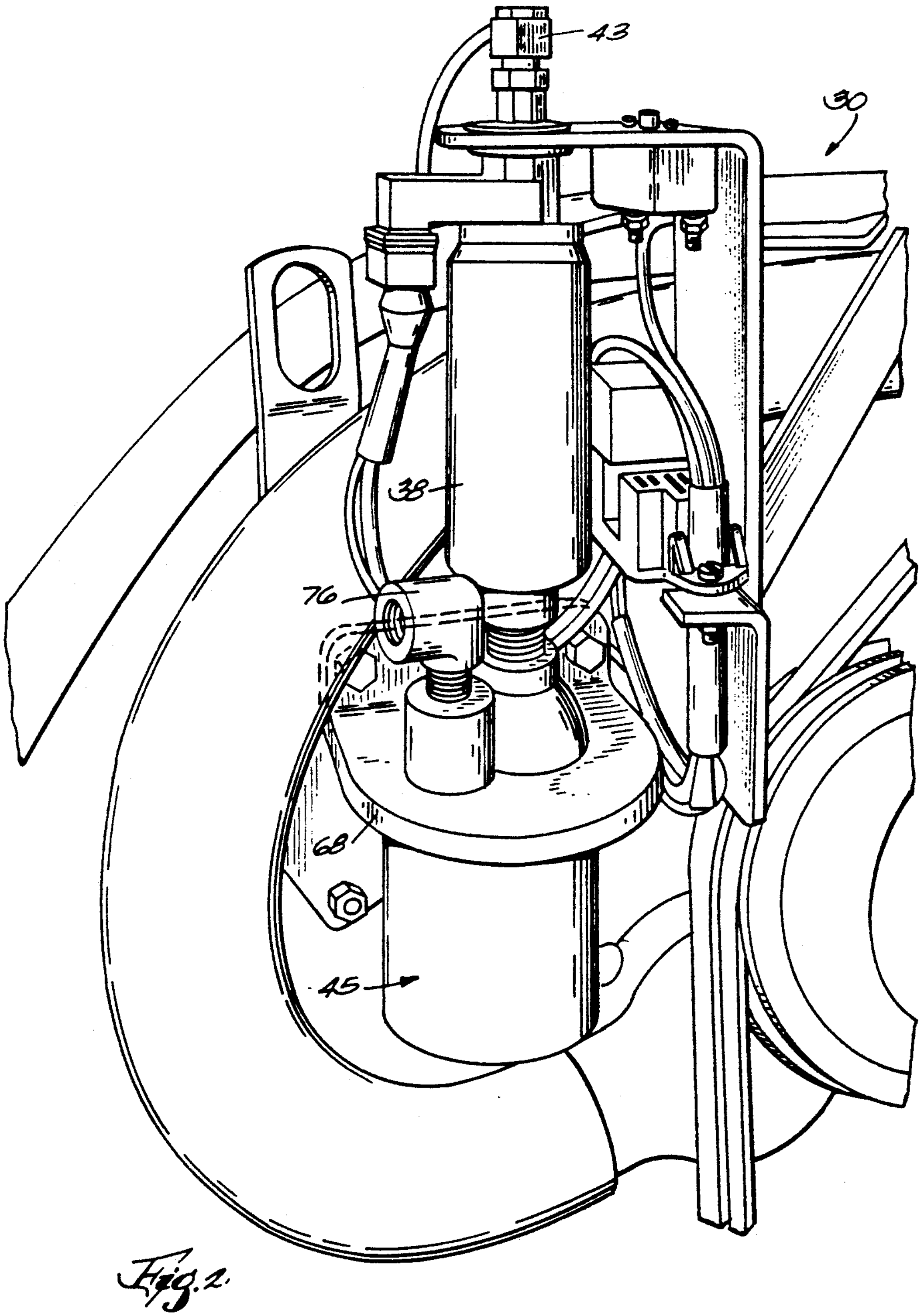
FIG. 2 is a partly broken away perspective view showing the fuel pump, fuel filter, and internal combustion engine of FIG. 1.

The marine installation 10 further includes a fuel pump 38 having upper and lower ends. The lower end of the pump 38 includes an annular portion defining an inlet 40 and having thereon internal threads 41. The upper end of the fuel pump 38 further includes an annular portion defining an outlet 42 and having thereon internal threads. The outlet 42 communicates with the internal combustion engine 30 via a banjo-style fuel fitting 43 (see FIGS. 2 and 3).

In the illustrated embodiment, the fuel pump 38 is an electric fuel pump including a positive displacement gerotor (not shown), and a high speed direct current electric motor (not shown) mechanically and fluidly connected to the gerotor and including first and second electrical terminals (not shown). The electric motor and the gerotor are housed in a sealed enclosure 44. Fuel is caused to enter into the inlet 40 of the fuel pump 38 by vacuum created by the gerotor. The fuel enters the electric motor, from the outlet of the gerotor, under pressure and fuel passes through the motor to cool the motor. The fuel exits the fuel pump at the fuel pump outlet 42. The electric motor of the fuel pump operates at a nearly constant speed (assuming that a nearly constant voltage is placed across it), and thus a nearly constant flow rate of fuel is produced by the fuel pump 38. To control fuel flow rate, the fuel pump 38 includes an internal pressure regulator (not shown) that routes fuel from the gerotor outlet to the gerotor inlet when the flow rate from the gerotor outlet is more than is required by the internal combustion engine 30.

Preferably, the pump 38 is a Model 609655 manufactured by Carter Automotive Co. Inc. This pump differs from traditional gerotor-type pumps in that it has very close tolerances and is therefore able to lift fuel 40 inches or more. This pump can consequently be mounted on a stern drive engine, as explained more fully below, and is capable of dry priming the engine.

Figure 3:
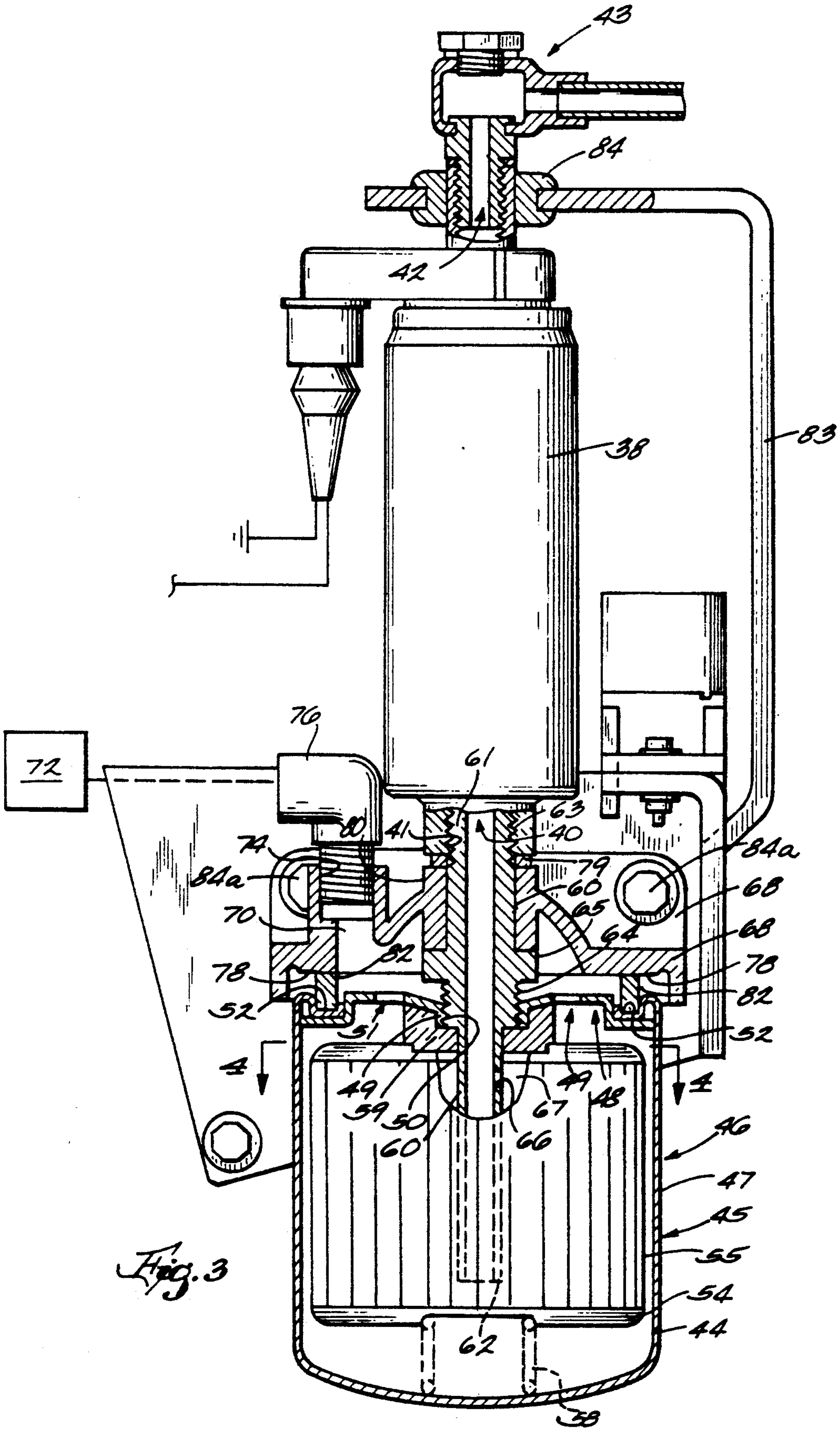
FIG. 3 is a side elevational view, partly broken away and partly in section, showing the fuel pump, fuel filter, and internal combustion engine of FIG. 2.

As best seen in FIG. 3, the marine installation 10 further includes a fuel filter 45 comprising a housing 46 including a cup-shaped portion 47 having a closed lower end and an open upper end. The housing 46 further includes a circular member 48 which closes the upper end of the cup-shaped portion 47, which includes a central portion defining an outlet 49 and having internal threads 50, and which has a series of apertures therethrough circularly surrounding the outlet 49 and defining an inlet 51. The circular member 48 also includes an annular surface 52 surrounding the inlet 51 of the fuel filter 45. While other volumes are possible, the volume of the illustrated fuel filter housing 46 is approximately 250 cubic centimeters. The fuel filter 45 further includes a filter element 53 supported by the housing 46 upstream of the fuel filter outlet 49 and downstream of the fuel filter inlet 51. In the illustrated embodiment, the filter element 53 is of the type generally having the shape of a hollow cylinder with a closed, non-porous circular bottom 54, a non-porous circular top 55 (see FIG. 4) having a central aperture 56 therethrough, and filter material between the top 55 and bottom 54 of the filter element 53 and in the general shape of a cylinder wall. The fuel filter element 53 defines a central chamber 67 (see FIG. 3) adapted to contain filtered fuel, and fuel vapor above the fuel. The chamber defined by the fuel filter element 53 is a sub-chamber of the chamber 67 defined by the fuel filter housing 46.

The fuel filter 45 further includes a spring 58 biasing the bottom 54 of the filter element 53 away from the bottom of the cup-shaped portion 47 of the housing 46. The fuel filter 45 further includes an interference seal 59, attached to the fuel filter housing 46, for a purpose that will later be described. The interference seal 59 is annular and is located between the circular member 48 and the filter element 53. The top 55 of the filter element 53 is biased against the interference seal 59 by the spring 58, so that the top 55 of the filter element 53 is sealed to the circular member 48 of the housing 46 by the interference seal 59, with the aperture 56 aligned with the outlet 49, so that fuel can only flow from the inlet 51 to the outlet 49 through the filter element 53.

The fuel filter 45 is selectively threadedly connected to the fuel pump 38 with the outlet 49 of the fuel filter 45 in fluid communication with the inlet 40 of the fuel pump 38.

An appropriate fuel filter 45 is one sold under Champion part number CE-16-14270, or one sold under Ford part number EOAY-9365-A.

The marine installation 10 further includes a tube 60 having a first or upper end 61, and a second or lower end 62. The upper end 61 of the tube 60 is connected to the inlet 40 of the fuel pump 38. Preferably, the upper end 61 of the tube 60 is threadedly connected to the inlet 40 of the fuel pump 38. In the preferred embodiment, the tube 60 includes external threads 63 threadedly engaging the threads 50 of the fuel filter outlet 49.

Preferably, the tube 60 is threadedly connected to the fuel filter 45 with the lower end 62 of the tube 60 in fluid communication with the outlet 49 of the fuel filter 45. In the preferred embodiment, the tube 60 extends through the outlet 49 and into the central chamber 67 defined by the filter element 53, via the aperture through the top of the filter element 53, and includes external threads 64 which are located between the upper end 61 and the lower end 62 of the tube 60 and which threadedly engage the threads 50 of the fuel filter 45. Thus, the fuel filter 45 is threadedly connected to the fuel pump 38 via the tube 60, and the tube 60 provides for fluid communication between the outlet 49 of the fuel filter 45 and the inlet 40 of the fuel pump 38. As shown in the drawings, the pump 38, the tube 60 and the filter 45 are centered on a common vertical axis.

The tube 60 is surrounded by the previously described interference seal 59 of the fuel filter 45, and the seal 59 seals the fuel filter housing 46 to the tube 60, and separates the inlet 51 of the fuel filter 45 from the outlet 49 of the fuel filter 45.

The tube 60 further includes a flange or enlarged diameter portion 65, between the threads 63 and the threads 64, for a purpose that will later be outlined.

In operation, heat from the internal combustion engine 30 may vaporize some of the fuel in the chamber defined by the fuel filter housing 46. This could result in a vapor-lock problem. To overcome this potential problem, a vapor bleed aperture 66 is provided in the tube 60. Preferably, the vapor bleed aperture 66 is located in an uppermost portion of the chamber defined by the filter element 53. When the fuel pump 38 operates, it draws liquid fuel through the second end 62 of the tube 60. Simultaneously, the fuel pump 38 draws a relatively small amount of fuel vapor through the vapor bleed aperture 66 (see arrow in FIG. 3). Thus, the marine installation 10 includes means for supplying a mixture of liquid fuel and fuel vapor to the fuel pump inlet 40 from the fuel filter 45.

The marine installation 10 further includes an interface or interface member 68 including a recess or cavity 70 communicating with a fuel supply 72 (see FIG. 3). To this end, in the illustrated embodiment, the interface 68 includes an internally threaded aperture 74 (see FIG. 3) communicating with the cavity 70 and threadedly receiving a fuel fitting 76 communicating with the fuel supply 72. The interface 68 further includes an annular surface 78 surrounding the cavity 70 and surrounding a portion of the tube 60. The interface 68 is supported by the engine block 32, as described below.

The marine installation 10 further includes means for securing the fuel pump 38 to the interface 68. While various other means could be employed, in the preferred embodiment, the means for securing the interface 68 to the fuel pump 38 includes the tube 60. More particularly, in the preferred embodiment, the interface 68 includes an annular sleeve portion 80 which surrounds the tube 60 and which is located between the inlet portion of the fuel pump 38, and the flange 65 of the tube 60. A seal 79 is located between the upper end of the sleeve portion 80 and the inlet portion of the fuel pump 38, and the flange 65 of the tube 60 abuts the sleeve portion 80 and applies a force on the sleeve portion 80, in a direction toward the fuel pump 38, to secure the interface 68 between the flange 65 and the fuel pump 38.

The marine installation 10 further includes selectively engageable means for sealing, when engaged, the fuel filter housing 46 to the interface 68 so that the inlet 51 of the fuel filter communicates with the cavity 70, and for interrupting, when disengaged, the flow of fuel from the fuel supply 72 to the interface cavity 70 while continuing to allow fuel to flow to the fuel pump 38 from the fuel filter 45 so that the fuel filter 45 can be substantially emptied of fuel.

While various other means could be employed, in the preferred embodiment, the sealing means includes an annular ring gasket 82 sealing the annular surface 78 of the interface to the annular surface 52 of the housing 46 The ring gasket 82 is preferably attached to the fuel filter housing 46 and is movable therewith. Further, the sealing means includes the threads 64 on the tube 60, and the threads 50 on the fuel filter 45, engagement of the threads 64 with the threads 50 causing compression of the ring gasket 82 between the fuel filter 45 and the interface 68 and resulting in the fuel filter 45 being sealed to the interface 68.

The marine installation 10 further includes a mounting bracket 83 including an elastomeric grommet 84 retainingly surrounding the annular portion of the fuel pump 38 defining the outlet 42. The mounting bracket 83 is supported by the engine block 32 of the internal combustion engine 30. More particularly, the bracket 83 is mounted directly on the engine block 32. Still more particularly, in the illustrated construction, the bracket 83 is mounted on the engine block 32 by bolts or screws (not shown) extending through the bracket 83 and into the block 32. The bracket 83 is rigid with regard to the interface 68. Specifically, the interface 68 is mounted on the bracket 83 by bolts 84*a*. The mounting bracket 83 thus supports the interface 68, and thereby the pump 38 and the filter 45, relative to the engine 30. Optionally, the mounting bracket 83 is integral with the interface 68 so that the fuel pump 38, the interface/mounting bracket, and the fuel filter 45 can be supported as a unit by the engine block 32 of the internal combustion engine 30.

The Coast Guard requires every fuel pump on an inboard engine to pass what is known as a "burn test" (specified in Title 33 Code of Federal Regulations, Subchapter S, Part 183), during which a fire burns beneath the pump for a certain period of time. This test is supposed to simulate conditions during a fire inside the boat. Location of the filter 45 below the pump 38 has been found to enable the pump 38 to pass the burn test. (The pump 38 may not as consistently pass the burn test if the pump 38 is oriented horizontally and not over the filter 45.) Thus, location of the filter 45 below the pump 38 provides a shield in the unlikely event of a fire inside the boat. In other words, the filter 45 serves as a shield between the pump 38 and any flames below the pump 38.

Mounting the filter 45 on the pump 38 minimizes the number of connections between the filter 45 and the pump 38 and thereby reduces the likelihood of leaks. Mounting the fuel pump 38 on the interface 68 and the interface 68 on the bracket 83 reduces heat transfer from the engine block to the pump 38, because heat from the engine block must pass through the interface 68 to reach the pump 38. Connecting the pump 38, the interface 68 and the fuel filter 45 as a "package" mounted on the engine allows the assembly of the pump 38, the interface 68 and the filter 45 to be tested both electrically and for leaks prior to mounting on the engine. Mounting the pump 38 on the engine allows the manufacturer of the engine to control the connection of the pump 38 to the engine.

Figure 5:
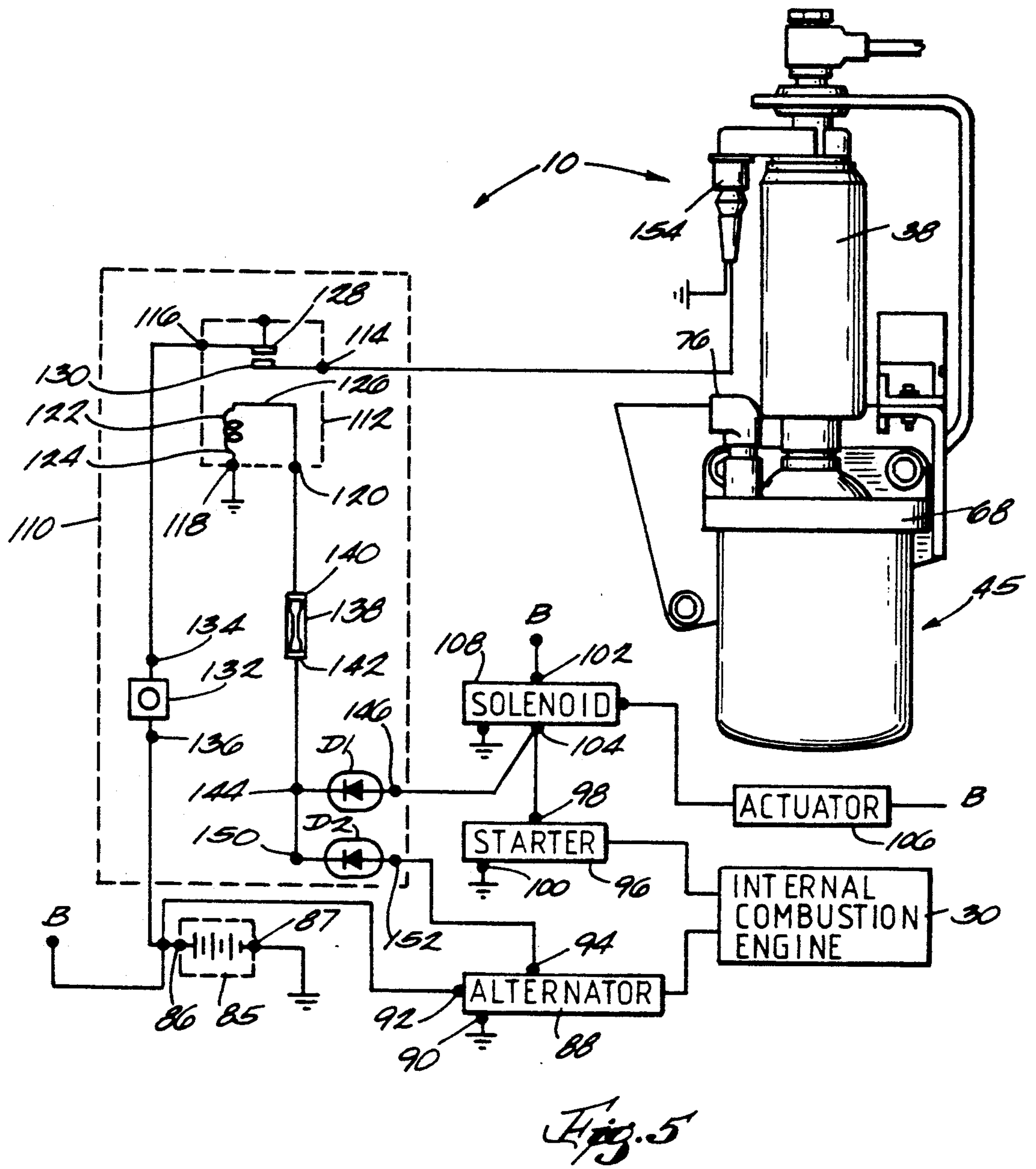
FIG. 5 is a circuit schematic showing a circuit in accordance with the invention and for operating the fuel pump of FIG. 1.

As best seen in FIG. 5, the marine installation 10 further includes a battery 85 having a positive terminal 86, and having a negative terminal 87. The negative terminal 87 is electrically connected to ground.

The marine installation 10 further includes means for providing a first electrical signal while the engine 30 is running. While various other means could be employed, in the preferred embodiment, the means for providing the first electrical signal includes an alternator 88 which is mechanically connected to the crankshaft 34 of the internal combustion engine 30. The alternator 88 has a stator terminal 90 electrically connected to ground, a B terminal 92 electrically connected to the positive terminal 86 of the battery 85, and a sense or output terminal 94. The sense terminal 94 provides a signal, in response to rotation of the crankshaft 34, that is used to cancel a warning light (not shown) that illuminates when the battery 85 is not being properly charged by the alternator 88. Thus, the sense terminal 94 of the alternator 88 provides the first electrical signal.

The marine installation 10 further includes (see FIG. 5) a starter 96 that is selectively operable to rotate the crankshaft 34 to start the internal combustion engine 30. The starter 96 has a terminal 98, and a terminal 100 electrically connected to ground, and the starter rotates the crankshaft in response to the terminal 98 being electrically connected to the positive terminal 86 of the battery 85.

The marine installation 10 further includes means for providing a second electrical signal while the starter 96 rotates the crankshaft 34. While various other means could be employed, in the preferred embodiment, the means for providing the second electrical signal includes a terminal 102 electrically connected to the battery 85, a terminal 104 electrically connected to the terminal 98 of the starter 96, and means for selectively connecting the terminal 102 to the terminal 104, thereby connecting the starter 96 to the battery 85 and providing the second electrical signal at the terminal 104.

While various other means could be employed, in the preferred embodiment, the means for selectively connecting the terminal 102 to the terminal 104 includes a user operable actuator 106, and a starter solenoid 108 having a start terminal electrically connected to the starter 96. The start terminal of the solenoid defines the terminal 104. The starter solenoid 108 is operative to connect the terminals 102 and 104 and to thereby cause the starter 96 to operate in response to actuation of the user operable actuator 106.

The marine installation 10 further includes means 110 for causing the fuel pump 38 to supply fuel to the internal combustion engine 30 only while at least one of the first and second signals is present and without regard to the oil pressure of the internal combustion engine 30.

The means 110 includes a relay 112 having terminals 114, 116, 118, and 120. The relay 112 includes a coil 122 having a first end 124 electrically connected to the terminal 118 and having a second end 126 electrically connected to the terminal 120. The relay 112 further includes a fixed contact 128 electrically connected to the terminal 116. The relay 112 further includes a movable contact 130 connected to the terminal 114 and movable into engagement with the fixed contact 128 to electrically connect the terminal 116 to the terminal 114, and movable out of engagement with the fixed contact 128 to electrically isolate the terminal 116 from the terminal 114. The movable contact 130 moves into engagement with the fixed contact 128 only when the coil 122 is energized. In the illustrated embodiment, the terminal 118 is electrically connected to ground, and the coil 122 is energized when a positive voltage is applied to the terminal 120. An appropriate relay is sold by the assignee of the present invention as Outboard Marine Corporation part number 582-472.

The means 110 further includes a circuit breaker 132 having a terminal 134 electrically connected to the terminal 116 of the relay 112, and having a terminal 136 electrically connected to the positive terminal 86 of the battery. In the illustrated embodiment, the circuit breaker 132 is a 12.5 Amp. circuit breaker.

The means 110 further includes an in-line fuse 138 having a terminal 140 electrically connected to the terminal 120 of the relay 112, and having a terminal 142.

The means 110 further includes a diode D1 having a cathode 144 electrically connected to the terminal 142 of the fusible link 138, and having an anode 146 electrically connected to the start terminal 104 of the solenoid 108

The means 110 further includes a diode D2 having a cathode 150 electrically connected to the terminal 142 of the fusible link 138, and having an anode 152 electrically connected to the sense terminal 94 of the alternator 88.

One of the electrical terminals of the motor of the fuel pump 38 is electrically connected to the terminal 114, and the other of the electrical terminals of the fuel pump 38 is electrically connected to ground. When current from the terminal 114 passes through the motor of the fuel pump 38 to ground, the fuel pump 38 operates to pump fuel.

In operation, when the internal combustion engine 30 is being started, current travels from the terminal 104 of the starter solenoid 108 through the diode D1, through the in-line fuse 138, and through the coil 122 to ground via the terminal 118. This energizes the coil 122, causing the movable contact 130 to move into contact with the terminal 128, thereby connecting the fuel pump 38 to the positive terminal 86 of the battery 85 via the circuit breaker 132 and causing the fuel pump 38 to pump fuel.

When the internal combustion engine 30 is running, current travels from the sense terminal 94 of the alternator 88 through the diode D2, through the in-line fuse 138, and through the coil 122 to ground via the terminal 118. This energizes the coil 122, causing the movable contact 130 to move into contact with the terminal 128, thereby connecting the fuel pump 38 to the positive terminal 86 of the battery 85 via the circuit breaker 132 and causing the fuel pump 38 to pump fuel.

When the internal combustion engine 30 is neither running nor being started, the coil 122 will not be energized, the contact 130 will not be in contact with the contact 128, the fuel pump 38 will not be connected to the positive terminal 86 of the battery 85, and the fuel pump 38 will not pump fuel.

Preferably, the marine installation 10 further includes a radio frequency interference filter or suppressor 154 for reducing the transmission of radio frequency interference, created by the electric motor of the fuel pump 38, to other electrical components electrically connected to the electric motor of the fuel pump 38. The radio frequency interference filter 154 is physically rigidly connected to and supported by the fuel pump 38, and is optionally housed in the housing 44 with the fuel pump 38, so that less space is required than for traditional in-line radio frequency interference filters. The filter 154 is removably mounted on the pump 38 in contact with the pump terminals. This location makes the filter 154 easily replaceable and maximizes the efficacy of the filter 154, because such an interference suppressor is most effective when located near the source of interference. When the movable contact 130 of the relay 112 moves into contact with the fixed contact 128 of the relay 112, current from the terminal 114 of the relay 112 travels through the fuel pump 38 via the radio frequency interference filter 154, and to ground.

FIG. 6 is substantially identical to FIG. 3, like reference numerals indicating like components, except that the apparatus shown in FIG. 6 further includes an electrically operated warning means 156, and an electromechanical vacuum switch 158 in fluid communication with the tube 60 and electrically connected to the warning means 156. The warning means 156 and the electromechanical vacuum switch 158 are electrically connected to a source of electrical energy, namely the battery 85. The electromechanical vacuum switch 158 is operable so that when the pressure in the tube 60 falls below a predetermined pressure, the vacuum switch 158 connects the warning means 156 to the battery 85, thereby causing the warning means 156 to produce a warning. The warning means could include audio means, such as a horn H, or the warning means could include visual means, such as an electric light L. In the preferred embodiment, the warning means includes both an electric light L and a horn H. Attention is directed to U.S. Baltz et al. Pat. No. 4,870,392, issued on Sep. 26, 1989, the disclosure of which is incorporated herein by reference.

Various of the features of the invention are set forth in the following claims.

We claim:

1. A marine propulsion device comprising a drive unit which is adapted to be mounted on the transom of a boat and which includes a propeller shaft, an internal combustion engine drivingly connected to said propeller shaft, an electric fuel pump for supplying fuel to said engine, said pump including a housing and electrical terminals fixed to said housing, and said marine propulsion device also comprising electrical wires adapted to be connected to a control circuit, and a radio frequency interference suppressor located outside of said housing, removably connected to said terminals, connected between said wires and said terminals, and rigidly supported by said housing, whereby said suppressor is easily replaceable.

2. A marine propulsion device as set forth in claim 1 wherein said device is a stern drive unit, and wherein said engine is adapted to be mounted inside the boat.

3. A marine propulsion device as set forth in claim 1 wherein said fuel pump is capable of lifting fuel approximately 40 inches from a remote fuel tank.

4. A marine propulsion device as set forth in claim 3 wherein said engine includes an engine block, and wherein said pump is mounted on said engine block.

5. A marine propulsion device as set forth in claim 4 and further comprising a bracket mounted directly on said engine block, and wherein said pump is mounted on said bracket.

6. A marine propulsion device as set forth in claim 5 and further comprising a fuel filter which communicates with said pump and which is supported by said bracket.

7. A marine propulsion device as set forth in claim 6 and further comprising an interface member which is supported by said bracket and which supports said filter and said pump relative to said bracket.

8. A marine propulsion device as set forth in claim 6 wherein said pump includes an upper end having therein an outlet communicating with said engine, and a lower end having therein an inlet adapted to communicate with a source of fuel, and wherein said fuel filter has an outlet communicating with said pump inlet and has an inlet adapted to communicate with the fuel source.

9. A marine propulsion device as set forth in claim 3 wherein said device is a stern drive unit, and wherein said engine is adapted to be mounted inside the boat.

10. A marine propulsion device as set forth in claim 3 and further comprising means located below said pump for shielding said pump from flames below said pump.

11. A marine propulsion device as set forth in claim 3 wherein said electric pump is non-submersible.

12. A marine propulsion device comprising a drive unit which is adapted to be mounted on the transom of a boat and which includes a propeller shaft, an internal combustion engine drivingly connected to said propeller shaft, an electric fuel pump for supplying fuel to said engine, said pump including an upper end having therein an outlet communicating with said engine, and a lower end having therein an inlet adapted to communicate with a source of fuel, and a fuel filter cartridge which is located directly below said pump and which includes a housing having an outlet communicating with said pump inlet and an inlet adapted to communicate with the fuel source, and a fuel filter located in said housing.

13. A marine propulsion device as set forth in claim 12 and further comprising a tube extending vertically and having an upper end communicating with said pump inlet and a lower end communicating with said filter outlet.

14. A marine propulsion device as set forth in claim 12 wherein said pump and said filter are both centered on a common generally vertical axis.

15. A marine propulsion device as set forth in claim 12 wherein said device is a stern drive unit, and wherein said engine is adapted to be mounted inside the boat.

16. A marine propulsion device as set forth in claim 12 wherein said engine includes an engine block, wherein said marine propulsion device further comprises a bracket mounted directly on said engine block, and wherein said pump and said filter are mounted on said bracket.

17. A marine propulsion device as set forth in claim 12 wherein said filter cartridge is threadedly connected to said pump.

18. A marine propulsion device as set forth in claim 12 wherein said electric pump is non-submersible.

19. A marine propulsion device comprising a drive unit which is adapted to be mounted on the transom of a boat and which includes a propeller shaft, an internal combustion engine drivingly connected to said propeller shaft, an electric fuel pump which is mounted on said engine and which includes an outlet communicating with said engine, and an inlet, and a fuel filter cartridge which is mounted on said engine and which includes a housing having an outlet communicating with said pump inlet and an inlet adapted to communicate with the fuel source, and a fuel filter located in said housing, said pump and said filter cartridge being operably connected to each other as a unit prior to mounting of said unit on said engine.

20. A marine propulsion device as set forth in claim 19 and further comprising a tube extending vertically and having an upper end communicating with said pump inlet and a lower end communicating with said filter outlet, and wherein said tube is operably connected to said pump and to said filter cartridge prior to mounting of said unit on said engine.

21. A marine propulsion device as set forth in claim 19 wherein said device is a stern drive unit, and wherein said engine is adapted to be mounted inside the boat.

22. A marine propulsion device as set forth in claim 19 wherein said engine includes an engine block, wherein said marine propulsion device further comprises a bracket mounted directly on said engine block, and wherein said unit is mounted on said bracket.

23. A marine propulsion device as set forth in claim 19 wherein said filter cartridge is threadedly connected to said pump.

24. A marine propulsion device as set forth in claim 19 wherein said electric pump is non-submersible.

25. A stern drive unit comprising a drive unit which is adapted to be mounted on the transom of a boat and which includes a propeller shaft, an internal combustion engine which is drivingly connected to said propeller shaft, which is adapted to be mounted inside the boat, and which includes an engine block, a non-submersible electric fuel pump which is mounted on said engine block and which supplies fuel to said engine, said pump including an upper end having therein an outlet communicating with said engine, a lower end having therein an inlet adapted to communicate with a source of fuel, and positive and negative terminals, a radio frequency interference suppressor removably mounted on said pump in contact with said terminals, and means located below said pump for shielding said pump from flames below said pump, said mean including a fuel filter cartridge which is located directly below said pump, and which includes a housing having an outlet communicating with said pump inlet, and an inlet adapted to communicate with the fuel source, and also includes a fuel filter located in said housing.

26. A marine propulsion device comprising a drive unit which is adapted to be mounted on the transom of a boat and which includes a propeller shaft, an internal combustion engine drivingly connected to said propeller shaft, a non-submersible electric fuel pump adapted to be located exteriorly of a fuel tank for supplying fuel from the tank to said engine, and fuel filter means upstream of said fuel pump.

27. A marine propulsion device as set forth in claim 26 wherein said device is a stern drive unit, and wherein said engine is adapted to be mounted inside the boat.

28. A marine propulsion device as set forth in claim 26 wherein said pump has an inlet, and wherein said filter means has an inlet adapted to communicate with the tank, and an outlet communicating with said pump inlet.

29. A marine propulsion device as set forth in claim 28 and further comprising a fuel tank having an outlet communicating with said filter inlet.

30. A marine propulsion device as set forth in claim 17 and further comprising a tube having a first end, and a second end, wherein said first end of said tube is threadedly connected to said inlet of said fuel pump, and wherein said tube is threadedly connected to said fuel filter housing with said second end of said tube in fluid communication with said outlet of said fuel filter housing, said tube thereby providing for fluid communication between said outlet of said fuel filter and said inlet of said fuel pump.

31. An apparatus comprising a fuel pump having an inlet and having an outlet adapted for fluid communication with an internal combustion engine, a fuel filter including a housing having an inlet and an outlet, said fuel filter further defining a chamber adapted to house liquid fuel and fuel vapor, a tube threadedly connected to said fuel filter housing and having a first end connected to said inlet of said fuel pump, and a second end extending into said portion of said chamber that is adapted to house liquid fuel, said tube thereby providing for fluid communication between said outlet of said fuel filter and said inlet of said fuel pump, and said tube including a vapor bleed aperture.

32. An apparatus comprising a fuel pump including an inlet and an outlet, a fuel filter including a housing, an inlet, an outlet, and a filter element supported by said housing upstream of said filter outlet and downstream of said filter inlet, and an interface member including a cavity which communicates with said filter inlet and which is adapted to communicate with a fuel supply, and a tube having a first end in threaded connection with fluid fuel pump to secure said fuel pump to said interface member and to provide fluid communication between said tube and said fuel pump inlet, and a second end in fluid communication with said outlet of said fuel filter.

33. An apparatus in accordance with claim 32 and further comprising selectively engageable means for sealing, when engaged, said fuel filter housing to said interface so that said inlet of said fuel filter communicates with said cavity, and for interrupting, when disengaged, the flow of fuel from the fuel supply to said interface cavity while continuing to allow fuel to flow to said fuel pump from said fuel filter so that said fuel filter can be substantially emptied of fuel.

34. An apparatus in accordance with claim 32 and further comprising an electrically operated warning means adapted to be electrically connected to a source of electrical energy, and an electromechanical vacuum switch which is adapted to be electrically connected to the source of energy, which is in fluid communication with said tube, which is electrically connected to said warning means, and which is operable so that, when the pressure in said tube falls below a predetermined pressure, said vacuum switch connects said warning means to the source of electrical energy, thereby causing said warning means to produce a warning.

35. An apparatus in accordance with claim 32 wherein said interface includes an annular surface surrounding said cavity and surrounding a portion of said tube, wherein said filter housing includes a corresponding annular surface surrounding said inlet of said fuel filter, and wherein said sealing means comprises an annular ring gasket sealing said annular surface of said interface to said annular surface of said housing.

36. An apparatus in accordance with claim 32 and further comprising an internal combustion engine receiving fuel from said outlet of said fuel pump and including an engine block, and wherein said interface is supported by said engine block.

37. Apparatus as set forth in claim 32 wherein said fuel filter housing defines a chamber adapted to house liquid fuel and fuel vapor, and wherein said apparatus further comprises means for supplying a mixture of liquid fuel and fuel vapor to said fuel pump inlet from said chamber.

38. Apparatus as set forth in claim 32 wherein said fuel filter further defines a chamber adapted to house liquid fuel and fuel vapor, wherein said tube is threadedly connected to said fuel filter housing with said second end of said tube extending into the portion of said chamber that is adapted to house liquid fuel, said tube thereby providing for fluid communication between said outlet of said fuel filter and said inlet of said fuel pump, and wherein said tube includes a vapor bleed aperture.

39. Apparatus as set forth in claim 32 wherein said filter housing is threadedly connected to said second end of said tube.

40. Apparatus as set forth in claim 39 wherein said first end of said tube is threadedly connected to said fuel pump.

41. An apparatus comprising a fuel pump having an inlet and an outlet adapted for fluid communication with an internal combustion engine, a fuel filter including a housing having an inlet, an outlet, and a filter element supported in said housing upstream of said filter outlet and downstream of said filter inlet, an interface member including a cavity which communicates with said filter inlet and which is adapted to communicate with a fuel supply, and a tube which has a first end in fluid communication with said fuel pump inlet, and a second end in fluid communication with said outlet of said fuel filter, and means including said tube for threadedly securing said interface member to one of said fuel pump and said fuel filter.

42. An apparatus in accordance with claim 41 wherein said fuel pump is an electric fuel pump.

43. An apparatus in accordance with claim 41 and further comprising an electrically operated warning means adapted to be electrically connected to a source of electrical energy, and an electromechanical vacuum switch which is adapted to be electrically connected to the source of energy, which is in fluid communication with said tube, which is electrically connected to said warning means, and which is operable so that, when the pressure in said tube falls below a predetermined pressure, said vacuum switch connects said warning means to the source of electrical energy, thereby causing said warning means to produce a warning.

44. An apparatus in accordance with claim 41 and further comprising selectively engageable means for sealing, when engaged, said fuel filter housing to said interface so that said inlet of said fuel filter communicates with said cavity, and for interrupting, when disengaged, the flow of fuel from the fuel supply to said interface cavity while continuing to allow fuel to flow to said fuel pump from said fuel filter so that said fuel filter can be substantially emptied of fuel.

45. An apparatus in accordance with claim 44 wherein said interface includes an annular surface surrounding said cavity and surrounding a portion of said tube, wherein said filter housing includes a corresponding annular surface surrounding said inlet of said fuel filter, and wherein said sealing means comprises an annular ring gasket sealing said annular surface of said interface to said annular surface of said housing.

46. An apparatus in accordance with claim 44 and further comprising an internal combustion engine receiving fuel from said outlet of said fuel pump and including an engine block, and wherein said interface is supported by said engine block.

47. An apparatus comprising a fuel pump having an inlet and an outlet adapted for fluid communication with an internal combustion engine, a fuel filter including a housing having an inlet and an outlet, said fuel filter housing defining a chamber adapted to house liquid fuel and fuel vapor, a filter element supported in said housing upstream of said filter outlet and downstream of said filter inlet, an interface threadedly connected to said housing and including a cavity in fluid communication with said filter inlet and adapted to communicate with a fuel supply, and a tube which has a first end threadedly connected to said fuel pump inlet in fluid communication therewith and to secure said fuel pump to said interface, and a second end in fluid communication with said outlet of said fuel filter, and means for supplying fuel vapor to said fuel pump inlet from said fuel filter.

48. An apparatus comprising a fuel pump having an inlet and an outlet adapted for fluid communication with an internal combustion engine, a fuel filter including a housing defining a chamber adapted to house liquid fuel and fuel vapor and having an inlet, and a filter element supported in said chamber downstream of said filter inlet, an interface including a cavity communicating with said filter inlet and adapted to communicate with a fuel supply, and a tube which has a first end threadedly connected to said fuel pump inlet, a second end threadedly connected to said housing and extending into said chamber in fluid communication therewith, thereby providing for fluid communication between said fuel filter chamber and said inlet of said fuel pump, and a vapor bleed aperture communicating with said fuel filter chamber.

49. An apparatus comprising a fuel pump including an inlet and an outlet, a fuel filter including a housing, an inlet, an outlet, and a filter element supported in said housing upstream of said filter outlet and downstream of said filter inlet, an interface member including a cavity which communicates with said filter inlet and which is adapted to communicate with a fuel supply, and a tube having a first end in fluid communication with said fuel pump inlet and a second end in threaded connection with said fuel filter to secure said fuel filter to said interface member and to provide fluid communication between said outlet of said fuel filter and said second end of said tube.

50. An apparatus comprising a fuel pump having an inlet and an outlet adapted for fluid communication with an internal combustion engine, a fuel filter including a housing having an inlet, and an outlet, and a filter element supported in said housing upstream of said filter outlet and downstream of said filter inlet, an interface member including a cavity which communicates with said filter inlet and which is adapted to communicate with a fuel supply, and a tube which has a first end in fluid communication with said fuel pump inlet, and a second end in fluid communication with said outlet of said fuel filter, and means for securing said interface member to both of said fuel pump and said fuel filter.

* * * * *